Patented Oct. 14, 1941

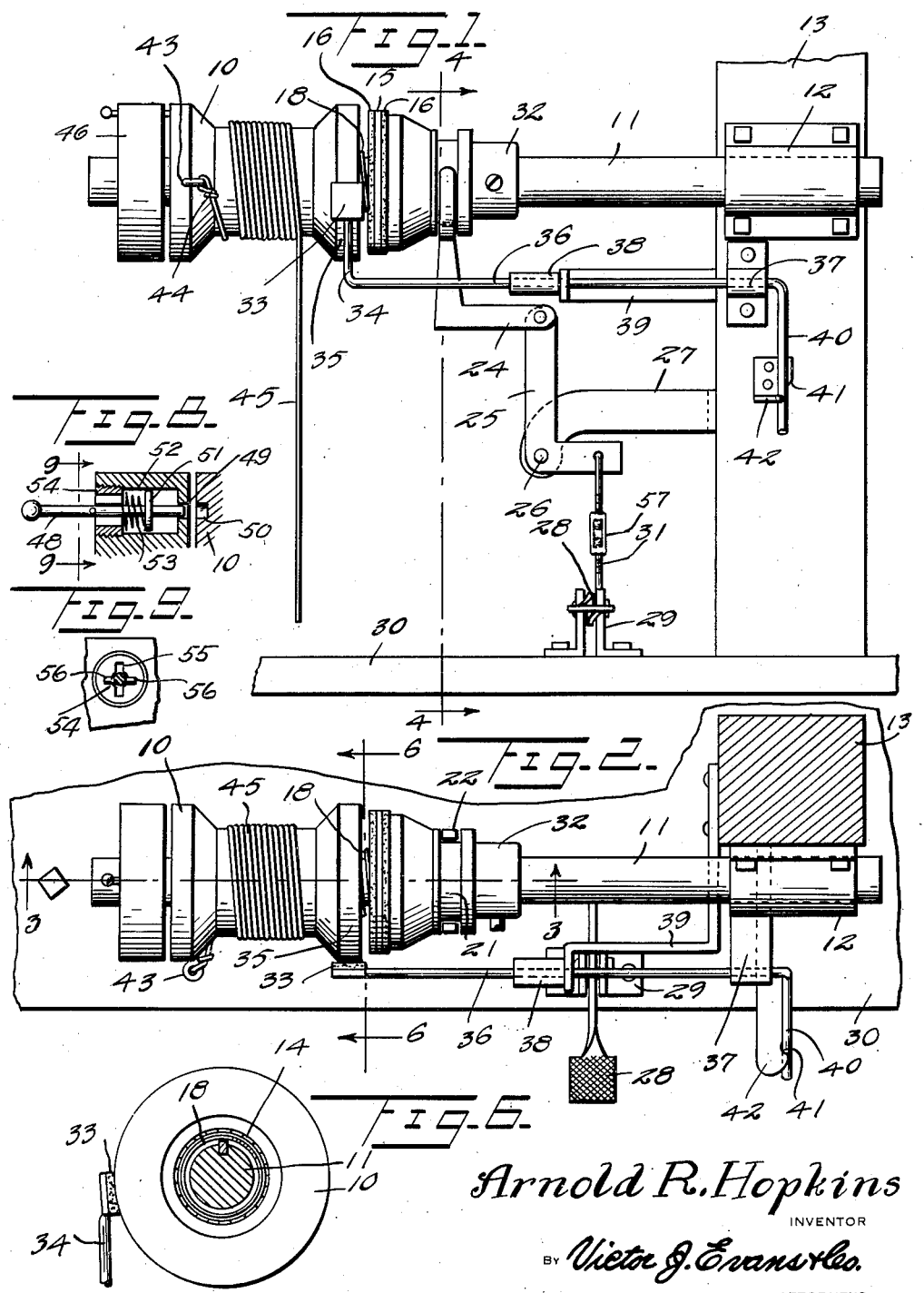

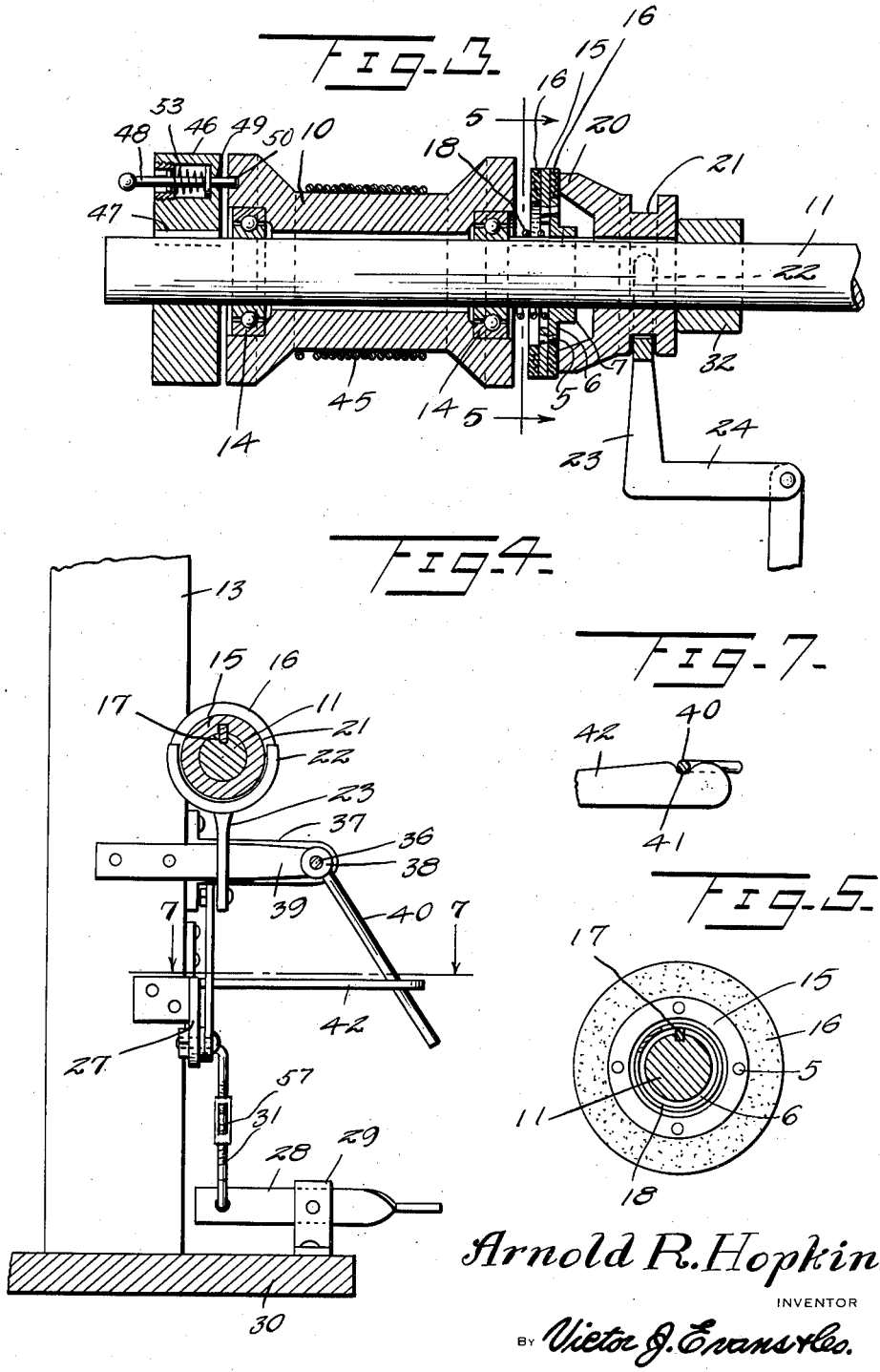

2,259,206

UNITED STATES PATENT OFFICE 2,259,206

CATHEAD FOR DRILLING APPARATUS

Arnold R. Hopkins, Nevada, Mo.

Application February 20, 1939, Serial No. 257,520

1 Claim. (Cl. 192—68)

This invention relates to catheads for drilling apparatus and has for an object to provide a cathead which floats on its drive shaft and is coupled to the shaft for rotation therewith through the medium of a clutch controlled by a lever located within convenient reach of the driller.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a side elevation of a cathead constructed in accordance with the invention.

Figure 2 is a plan view of the parts shown in Figure 1 with parts broken away.

Figure 3 is a longitudinal sectional view of the cathead taken on the line 3—3 of Figure 2.

Figure 4 is a cross sectional view of the cathead taken on the line 4—4 of Figure 1.

Figure 5 is a detail cross sectional view taken on the line 5—5 of Figure 3 showing the clutch disc and control spring.

Figure 6 is a detail cross sectional view taken on the line 6—6 of Figure 2 showing the brake of the cathead.

Figure 7 is a detail cross sectional view taken on the line 7—7 of Figure 4 showing the latch for the control lever.

Figure 8 is a detail sectional view of the cathead drum locking pin in released position.

Figure 9 is a detail cross sectional view taken on the line 9—9 of Figure 8.

Ordinarily the cathead reel or drum is fixed solid to its driving shaft so that when the operator wishes to screw up a drill pipe to insert the same in the drill hole, the shaft is started in motion and one helper wraps a rope around the drill pipe while another helper wraps enough of the rope around the reel or drum of the cathead to screw the pipe up. The present invention it will be here pointed out eliminates the services of one helper in that the rope is fastened to the cathead drum and the driller himself operates the clutch lever to start the drum rotating to screw up the pipe.

Referring now to the drawings in which like characters of reference designate similar parts in the various views, 10 designates a cathead drum, the same being loosely mounted upon a drive shaft 11 which is journaled at one end in a bearing 12 secured to a post 13 or other support. Anti-friction bearings 14 are disposed between the drive shaft and the ends of the drum.

A single plate annual clutch disc 15, provided on both sides with facings 16, is pinned, as shown at 5, to the flange 6 of a hub 7 which is splined on the shaft 11, as shown at 17 in Figure 5. A coil spring 18 is sleeved on the shaft between one end of the drum and the flange of the hub and normally holds the clutch disc in engagement with a pressure plate 20 which is mounted on the shaft and is provided with an integral grooved collar 21 in which is engaged the branches 22 of a forked shipper 23 which terminates in an extension 24 which extends parallel with the shaft 11. A bell crank lever 25 is connected to the extension and pivoted at its elbow as shown at 26 to a bracket 27 which is secured to the supporting post 13. A treadle 28 is pivotally mounted on a bracket 29 which is secured to a base 30. A link 31 connects the treadle with the free leg of the bell crank lever.

When it is desired to connect the drum to the shaft the operator depresses the pedal thereby swinging the bell crank lever and moving the shipper in the direction of the drum to carry the pressure plate and the clutch disc as a unit longitudinally of the shaft 11 to engage the clutch disc with the end face of the drum.

A collar 32 is fixed to the shaft beyond the pressure plate and prevents the pressure plate from moving out of proper position with relation to the clutch disc. The spring 18, through its cooperation with the clutch disk 15, also acts to maintain the pressure plate in engagement with the stop collar when the clutch is disengaged.

A brake shoe 33 is disposed on one end of a brake lever 34 and engages a flat brake surface 35 formed on one of the flanges of the drum. The brake lever is provided with a shaft 36 which is journaled at one end in a bearing 37 carried by the post 13 and intermediate its ends is journaled in a bearing 38 carried by a Z-shaped bracket 39 which also is fixed to the post.

A handle lever 40 is connected to the end of the brake shaft 36 and is normally engaged in a notch 41 formed in a keeper 42 which is secured to the post 13. When the handle lever is engaged in the notch of the keeper the brake is applied to the brake surface of the drum. When the operator slides the brake shaft 36 endwise to disengage the handle lever from the notch in the keeper the brake is released from engagement with the drum.

An eye 43 is formed on one of the flanges of the drum and to this eye one end 44 of a rope 45 is secured so that the rope may be wound with a plurality of turns upon the drum. The free end of the rope, as is customary, is wrapped around the pipe to be screwed up.

For locking the drum 10 rigid to the shaft 11 a collar 46 is keyed to the shaft as shown at 47. A locking pin 48 projects through a recess 49 formed in the collar and is adapted to engage in a recess 50 formed in the confronting face of the adjacent flange of the drum. The pin is provided with a collar 51 which slidably fits in an enlarged portion 52 of the recess. A helical spring 53 is sleeved on the pin and is confined under tension between the collar 51 and a bushing 54 which is threaded into the end of the recess 52 and is provided with a slot 55 best shown in Figure 9. A pair of oppositely disposed lugs 56 project from the pin 48.

The lugs 56 normally are turned to engage the outer face of the bushing 54 and hold the pin 48 retracted from the recess 50. By turning the pin 48 a quarter turn the lugs 56 pass into the slot 55 and permit the spring 53 to expand and urge the pin 48 into the recess 50 to lock the drum to the collar 46 and shaft 11.

As best shown in Figures 1 and 4, a turnbuckle 57 is associated with the link 31 to adjust the length of the link.

In operation the services of only one operator are required to shift the clutch to active position when it is desired to screw on a section of pipe since the rope is carried permanently by the drum and the drum is loose on the shaft at all times except at the moment the clutch is moved to operative position. The brake is normally held applied or set to prevent unwinding of the rope from the drum and is released just before it is desired to clutch the drum for rotation as a unit with the shaft.

When it is desired to permanently lock the drum to the shaft the locking pin 48 is given a quarter turn and is moved by its controlling spring to engage the drum and lock the drum rigidly to the shaft.

From the above description it is thought that the construction and operation of the invention will be fully understood without further explanation.

What is claimed is:

A cat head clutch for clutching cat heads to a shaft, comprising the combination with a shaft of a single plate annular clutch disk provided on both sides with facings, a hub splined on the shaft provided with a flange, connectors engaged through the clutch disk and the flange, a helical spring sleeved on the shaft engaging the flange, a pressure plate splined on the shaft against which said spring yieldably holds the facing on one side of the clutch disk, said pressure plate being provided with an integral grooved collar for receiving a shipper, and a stop collar on the shaft in rear of the pressure plate against which said spring yieldably holds the pressure plate to hold the clutch unclutched.

ARNOLD R. HOPKINS.